(12) United States Patent
Johnson et al.

(10) Patent No.: US 7,410,372 B2
(45) Date of Patent: Aug. 12, 2008

(54) WEATHERPROOF COVER ASSEMBLY

(75) Inventors: Steven J. Johnson, Galien, MI (US); David Meyers, Kaysville, UT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 11/509,071

(22) Filed: Aug. 24, 2006

(65) Prior Publication Data

US 2008/0047730 A1 Feb. 28, 2008

(51) Int. Cl.
*H01R 13/44* (2006.01)

(52) U.S. Cl. .......................................... 439/142; 174/66

(58) Field of Classification Search .................... 174/66, 174/67, 53, 54, 55, 56, 57, 58; 439/136, 439/142, 144

See application file for complete search history.

(56) References Cited

U.S. PATENT DOCUMENTS

| 872,694 | A | 12/1907 | Thiem |
|---|---|---|---|
| 1,784,277 | A | 12/1930 | Darlington |
| 2,916,733 | A | 12/1959 | Hirsch |
| 3,104,774 | A | 9/1963 | Hudson et al. |
| 3,252,611 | A | 5/1966 | Weitzman et al. |
| 3,432,611 | A | 3/1969 | Gaines et al. |
| 3,437,738 | A | 4/1969 | Wagner |
| 3,438,534 | A | 4/1969 | Zerwes |
| 3,491,327 | A | 1/1970 | Tait et al. |
| 3,518,356 | A | 6/1970 | Friedman |
| 3,525,450 | A | 8/1970 | Payson |
| 3,530,230 | A | 9/1970 | Cormier et al. |
| 3,544,703 | A | 12/1970 | Jones |
| 3,564,112 | A | 2/1971 | Algotsson |
| 3,654,663 | A | 4/1972 | Algotsson |
| 3,690,035 | A | 9/1972 | Schindlauer |
| 3,895,179 | A | 7/1975 | Wyatt |
| 4,197,959 | A | 4/1980 | Kramer |
| 4,342,493 | A | 8/1982 | Grenell |
| 4,424,407 | A | 1/1984 | Barbic |
| 4,634,015 | A | * | 1/1987 | Taylor ........................ 220/3.7 |
| 4,737,599 | A | 4/1988 | Fontaine |
| 4,803,307 | A | * | 2/1989 | Shotey ........................ 174/67 |
| 4,833,277 | A | 5/1989 | Jacoby, Jr. et al. |
| 4,998,635 | A | 3/1991 | Vink et al. |
| 5,045,640 | A | 9/1991 | Riceman |
| 5,072,848 | A | 12/1991 | Pipis et al. |
| 5,076,641 | A | 12/1991 | Lindberg |
| 5,148,348 | A | * | 9/1992 | White ........................ 361/658 |
| 5,161,983 | A | 11/1992 | Ohno et al. |
| 5,178,350 | A | 1/1993 | Vink et al. |
| 5,228,584 | A | 7/1993 | Williams |
| 5,243,135 | A | 9/1993 | Shotey et al. |
| 5,245,507 | A | 9/1993 | Ericksen |
| 5,252,083 | A | 10/1993 | Correnti |
| 5,280,135 | A | * | 1/1994 | Berlin et al. .................. 174/67 |

(Continued)

*Primary Examiner*—Thanh-Tam T Le
(74) *Attorney, Agent, or Firm*—Garrett V. Davis; Mark S. Bicks; Alfred N. Goodman (57) ABSTRACT

A cover assembly for attaching to an electrical box includes a base, a body and a cover hinged to the body. The assembly is mounted to the electrical box to protect an electrical device from moisture while allowing access to the electrical device. The base has a flange around the perimeter to form an open top end. The flange has a coupling member on its inner face to mate with an outer surface of the body.

28 Claims, 7 Drawing Sheets

U.S. PATENT DOCUMENTS

| | | |
|---|---|---|
| 5,317,108 A | 5/1994 | Prairie, Jr. |
| 5,362,924 A | 11/1994 | Correnti |
| 5,382,755 A | 1/1995 | Correnti |
| 5,456,373 A | 10/1995 | Ford |
| 5,486,650 A | 1/1996 | Yetter |
| 5,527,993 A | 6/1996 | Shotey et al. |
| 5,533,637 A | 7/1996 | Williams |
| 5,556,289 A | 9/1996 | Holbrook, Jr. |
| 5,574,255 A * | 11/1996 | Simmons ..................... 174/53 |
| 5,594,205 A | 1/1997 | Cancellieri et al. |
| 5,621,192 A | 4/1997 | Bordwell |
| D379,176 S | 5/1997 | Chambers et al. |
| 5,651,696 A | 7/1997 | Jennison |
| 5,703,329 A | 12/1997 | Delone |
| 5,731,544 A | 3/1998 | Burck et al. |
| D395,283 S | 6/1998 | Monaco et al. |
| 5,762,224 A | 6/1998 | Benn |
| 5,763,831 A | 6/1998 | Shotey et al. |
| 5,773,760 A | 6/1998 | Stark |
| D397,995 S | 9/1998 | Lamar et al. |
| D400,507 S | 11/1998 | Monaco |
| 5,877,450 A | 3/1999 | Quin |
| 5,912,432 A | 6/1999 | Thomas |
| 5,955,702 A | 9/1999 | Grossman et al. |
| 6,007,353 A | 12/1999 | Webster |
| 6,133,531 A | 10/2000 | Hayduke et al. |
| 6,198,046 B1 | 3/2001 | Moodie |
| 6,309,239 B1 | 10/2001 | Johnston |
| 6,372,987 B1 | 4/2002 | Ha |
| 6,417,450 B1 | 7/2002 | Young |
| 6,420,653 B1 | 7/2002 | Shotey et al. |
| 6,420,654 B1 | 7/2002 | Shotey et al. |
| 6,441,307 B1 | 8/2002 | Shotey et al. |
| 6,457,843 B1 | 10/2002 | Kester |
| 6,476,321 B1 | 11/2002 | Shotey et al. |
| 6,519,208 B2 | 2/2003 | DeVries |
| 6,642,453 B2 | 11/2003 | Shotey et al. |
| 6,649,838 B1 | 11/2003 | Lopez |
| 6,700,063 B2 | 3/2004 | Shotey et al. |
| 6,737,576 B1 * | 5/2004 | Dinh ........................... 174/50 |
| 6,770,814 B2 | 8/2004 | Shotey et al. |
| 6,770,815 B1 | 8/2004 | Shotey et al. |
| 6,770,816 B2 | 8/2004 | Shotey et al. |
| 6,891,104 B2 * | 5/2005 | Dinh ........................... 174/67 |
| 6,921,861 B1 * | 7/2005 | Gretz ........................... 174/67 |
| 6,960,721 B2 | 11/2005 | Shotey et al. |
| 6,987,225 B2 | 1/2006 | Shotey et al. |
| 7,033,040 B2 * | 4/2006 | Spahr et al. .................. 362/155 |
| 2006/0231282 A1 * | 10/2006 | Greenfield ................... 174/67 |

* cited by examiner

WEATHERPROOF COVER ASSEMBLY

FIELD OF THE INVENTION

The present invention is directed to an electrical box assembly having a base, a body and a cover pivotally connected to the body. The base is snapped onto and over a bottom edge of the body. The invention is also directed to an electrical box cover assembly having a hinged cover that is removable and can be coupled to a selected hinge member to enable the cover to pivot in different directions.

BACKGROUND OF THE INVENTION

Electrical boxes are mounted in various locations and positions depending on the particular application. Electrical boxes that are mounted outside and exposed to the weather require suitable shielding to protect the electrical device and electrical plugs and cords from the weather and particularly rain. Therefore, electrical outlet boxes mounted outside typically have one or more covers to close around the electrical device and the electrical cords.

Although building codes may vary between areas, most codes require the cover to be self-closing so that cover will automatically close around the electrical device when released. The cover is either spring biased or gravity operated. The gravity operated covers are often preferred since they eliminate additional parts and springs and are less likely to malfunction.

The gravity operated devices require the hinge to be located along a top edge of the body or mounting face plate so that the cover will pivot downwardly to a closed position by the weight of the cover. The body of the assembly is often constructed to have a removable face plate for attaching to the electrical device or mating with an electrical device. The removable face plate can be replaced with another face plate having an opening oriented to accommodate the electrical device so that the cover is oriented to close by the weight of the cover. Examples of cover assemblies having a removable plate are disclosed in U.S. Pat. No. 5,280,135 to Berlin. In this device, one removable plate can be replaced with a different plate where each plate has a different shaped opening to accommodate different electrical devices.

Another construction of cover assemblies that can be mounted in different orientations has a hinge member on two adjacent sides of the body and two adjacent sides of the cover. The body and cover can be oriented in the selected horizontal or vertical position and the appropriate members are coupled together. The hinge members that are not being used can be removed or are positioned to be inactive. Examples of this type of cover are disclosed in U.S. Pat. No. 6,891,104 to Dinh, U.S. Pat. No. 6,987,225 to Shotey, U.S. Pat. No. 4,874,906 to Shotey and U.S. Pat. No. 4,803,307 to Shotey.

Another cover assembly is disclosed in U.S. Pat. No. 6,133,531 to Hayduke. This assembly includes a body portion and a hinged cover. The hinge is mounted on a corner between two adjacent sides of the cover and body so that the cover pivots along an axis that is diagonal with respect to the longitudinal dimension of the cover and body. The cover and body can be mounted in a horizontal or vertical orientation so that the cover will close by the weight of the cover.

While the above assemblies are generally acceptable for the intended purpose, there is a continuing need for an improved cover assembly.

SUMMARY OF THE INVENTION

The present invention is directed to an electrical box cover assembly that can be attached to an electrical box to enclose an electrical device. The invention is also directed to a cover assembly for an electrical box having a pivotally mounted cover and a removable base that allows the assembly to accommodate various electrical devices.

One aspect of the invention is to provide a cover assembly having a body and a removable mounting base coupled to a bottom end of the body. The mounting base has one or more openings to receive an electrical device such as a duplex electrical outlet or switch.

Another aspect of the invention is to provide a weatherproof outlet cover assembly having a hinged cover that can be mounted to pivot along two different axes. The cover assembly has a body with hinges on a top wall and a side wall. The cover has two hinges on a top and side of the cover to connect to one of the hinges on the body.

A further aspect of the invention is to provide a weatherproof electrical box cover assembly having a body, and a mounting base that snaps to the bottom end of the body. The mounting base has flange on its outer edge to define an open top end. The bottom end of the body is received in the open end of the mounting base to form a weatherproof seal between the body and the mounting base. The mounting base fits over the bottom end of the body.

The invention is also directed to a cover assembly having a cover pivotally connected to a body and a plurality of mounting bases that can be selectively attached to a bottom end of the body. Each mounting bases has a different shaped opening for selectively receiving a particular electrical device.

A further feature of the invention is to provide a cover assembly having a body with an open bottom end and a mounting base coupled to a body by a snap connection. In one embodiment, the snap connection includes a detent or hook-like member extending inwardly from the mounting base and the outer surface of the body includes a recess complementing the detent.

These and other aspects of the invention are basically attained by providing a cover assembly for mounting to an electrical box for shielding an electrical device mounted in the electrical box. The assembly comprises a mounting base for mounting to an electrical box. The mounting base has a bottom wall with a top face and a bottom face and has mounting holes for receiving a fastener for mounting the mounting base to an electrical box. The mounting base has a flange extending in a substantially upward direction from a peripheral edge of the mounting base and defining an open end of the mounting base. A body has a side wall with an open top end and an open bottom end, an inner surface and an outer surface. The bottom end of the body is received in the open end of the mounting base and is coupled to the mounting base. A hinge member is on the side wall of the body at the top end. A cover member is coupled to the hinge member and is pivotable between an open position and a closed position.

The aspects of the invention are further attained by providing a cover for mounting to an electrical box for protecting electrical components. The assembly comprises a mounting base for mounting to an electrical box. The mounting base has a bottom wall with a top face and bottom face and has mounting holes for receiving a fastener for coupling the mounting base to an electrical device and the electrical box. A flange extends in a substantially upward direction from a peripheral edge of the top face. The flange has an inner face with at least one first coupling member extending inwardly therefrom. A body has a side wall with an open top end, an open bottom end, an inner surface and an outer surface. A lip extends downwardly from the bottom end of the side wall. The lip has an inner face and an outer face. The outer face has a second coupling member complementing the first coupling member for coupling the mounting base to the body. A hinge member is on the side wall of the body at the open top end. A cover member is coupled to the hinge member and is pivotable between an open position and a closed position.

The aspects of the invention are also attained by providing a cover assembly for mounting to an electrical box supporting an electrical device and shielding the electrical device. The assembly comprises a mounting base for mounting to the electrical box. The mounting base has a bottom wall with an access opening receiving the electrical device, and mounting holes for receiving a fastener for coupling the mounting base to the electrical device. A flange extends in an upward direction from a peripheral edge of the mounting base to define an open top end of the mounting base. The flange has an inner face with at least one coupling member. A body has a side wall with an open top end, an open bottom end, an inner surface and an outer surface. A lip extends from an inner edge of the bottom end of the body in a direction substantially parallel to the side wall. The lip is spaced from the outer surface of the side wall to define a shoulder on an axial face of the side wall. The lip has an outer surface with a coupling member to complement the coupling member on the flange. The lip mates with the flange to couple the mounting base to the body. A top face of the flange opposes the shoulder of the side wall of the body and the flange is received in the open top end of the mounting base. A seal member is disposed between the shoulder and the top end of the flange. A cover member is hinged to the body and is pivotable between an open and closed position.

These and other aspects of the invention will become apparent from the following detailed description of the invention, which taken in conjunction with the annexed drawings, disclose various embodiments of the invention.

BRIEF DESCRIPTION OF THE DRAWINGS

The following is a brief description of the drawings, in which.

DETAILED DESCRIPTION OF THE INVENTION

The present invention is directed to an electrical box assembly for attaching to an electrical box to enclose the electrical device supported by the electrical box. More particularly, the invention is directed to a waterproof or weather resistant cover assembly having a hinged cover forming an internal cavity for enclosing plugs and wires connected to the electrical device.

Figure 1:
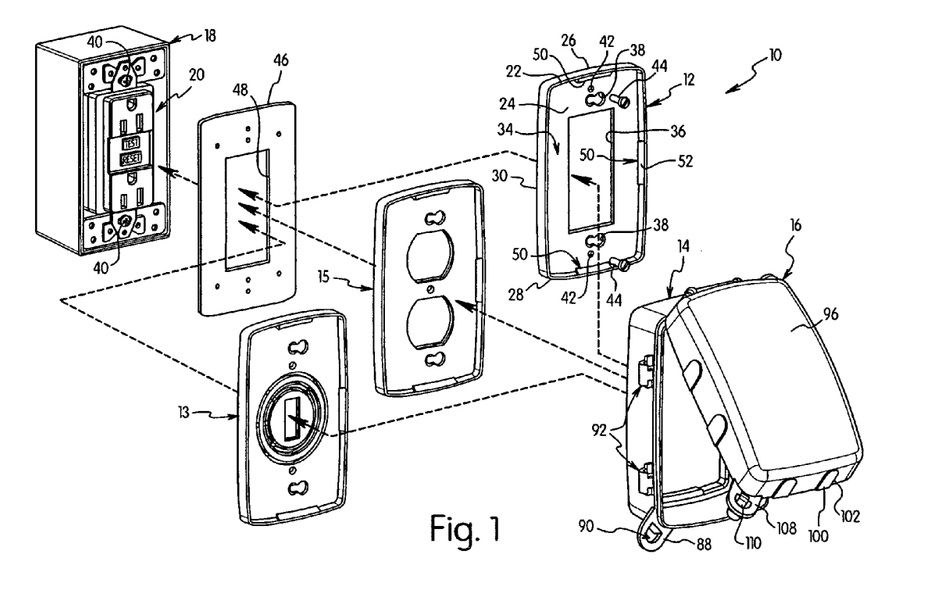
FIG. 1 is an exploded perspective view of the cover assembly of an embodiment of the invention showing the replaceable base.

The cover assembly 10 of the invention basically includes a mounting base 12, a body 14 and a cover 16. As shown in FIG. 1, the assembly 10 is connected to an electrical box 18 that supports an electrical device 20 such as an electrical duplex receptacle. The electrical box 18 can be a standard electrical box that can be mounted to a post or other support surface by a fastener extending through a side wall or back wall of the electrical box. The electrical box 18 can also be mounted within a wall structure so that the front edge of the electrical box is substantially flush with the outer surface of the wall. Electrical wiring (not shown) is connected to the electrical receptacle 20 as known in the art.

In one embodiment of the invention, the weatherproof cover assembly is a kit of unassembled components that include base 12, base 13, base 15 and the body 12 and cover 16. As shown in FIG. 1, the different bases are provided to accommodate different electrical devices mounted in the electrical box 18. For example, base 12 accommodates the electrical receptacle 20, base 13 accommodates a switch and base 15 accommodates a standard duplex receptacle. For purposes of discussion, base 12 will be discussed in connection with the various embodiments of the invention. It will be understood that the base 12 can be substituted by a similar base such as base 13 and 15.

Base 12 has a dimension complementing the shape of electrical box 18 and the dimensions of body 14. Base 12 has a flange 22 defining a side wall extending in an axial direction. In the embodiment illustrated, base 12 has a bottom wall with top and bottom side edges 26 and 28 and opposite side edges 30 and 32 extending perpendicular to top and bottom edges. Flange 22 extends around the peripheral edge of bottom wall 24 in a direction substantially perpendicular to the plane of bottom wall 24. In the embodiment illustrated in FIG. 1, base 12 has a substantially rectangular configuration to accommodate a single electrical device. In other embodiments, base 12 can have a substantially square configuration to accommodate a two gang electrical box. In still further embodiments, base 12 can have a suitable dimension to accommodate a multi-gang electrical box as needed.

In the embodiment illustrated, flange 22 is continuous around the peripheral edge of bottom wall 24 to define an open top end 34 of base 12. Flange 22 generally has a shape to correspond to the shape of the base 12. In the embodiment illustrated the base 12 and flange 22 have a generally rectangular shape with corresponding side portions that mate with body 14. In one embodiment, the side portions of flange 22 have a slight curved shaped corresponding to the shape of the body 14. In other embodiments, flange 22 can be discontinuous depending on the intended use of the assembly. Generally, a continuous flange 22 as shown is preferred to provide a weather-tight seal between base 12 and body 14.

Bottom wall 24 of base 12 includes at least one opening 36 for receiving electrical receptacle 20. Opening 36 can be any suitable shape needed to accommodate the electrical receptacle 20. In one embodiment bottom wall 34 is integrally formed with base 12 and flange 22. In other embodiments, a separate plate can be attached to base 12 having an opening to accommodate the electrical device 20.

Keyhole shaped apertures 38 are provided in bottom wall 24 to receive a screw 40 to couple base 12 to electrical receptacle 20 and electrical box 18. Screw 40 in the embodiment shown is a screw that attaches electrical receptacle 20 to electrical box 18. Screws 40 are unscrewed a distance to allow the head of the screw to pass through the large open area of the keyhole shaped opening. Base 12 is then moved to align the shaft of screw 40 with the narrow portion of keyhole shaped aperture 38. Screw 40 is then tightened to simultaneously attach electrical receptacle 20 to electrical box 18 and attach base 12 to electrical receptacle 20. Circular apertures 42 are formed in bottom wall 24 to receive a faceplate screw 44 that is threaded into a mounting flange of electrical receptacle 20.

In the embodiment illustrated, a gasket material 46 is provided between electrical box 18 and base 12 to form a weather tight seal. In the embodiment illustrated, gasket 46 is formed from a sheet material having an outer dimension to contact the outer edges of electrical box 18 and having a central opening 48 to receive the face of electrical receptacle 20. Typically, gasket 46 is formed from a flexible and resilient plastic material capable of forming a weatherproof seal between electrical box 18 and base 12.

Figures 5, 6:
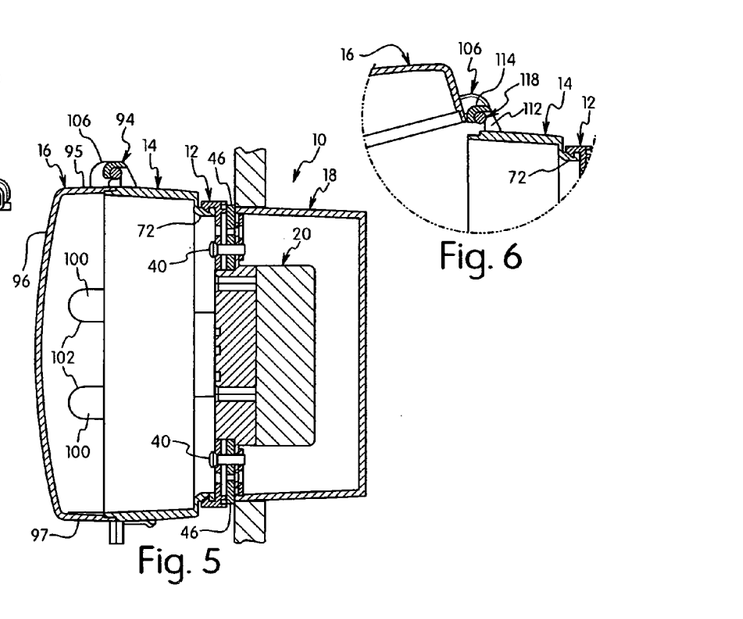
FIG. 5 is a cross-sectional view of the cover assembly taken along line 5-5 of FIG. 4.
FIG. 6 is a partial cross-sectional view of the hinge assembly of the body and cover.

Referring to FIGS. 1 and 5, each side edge of flange 22 includes a hook-shaped coupling member 50 extending inwardly from flange 22 in a direction toward a center of base 12. As shown in FIGS. 1 and 7B, each longitudinal side and each transverse side of flange 22 includes an inwardly extending hook member 50. Hook member 50 has an inclined top surface 52 and a substantially flat bottom surface 54 extending substantially perpendicular to the plane of flange 22. Bottom surface 54 of each flange is substantially parallel to bottom wall 24. In the embodiment illustrated, hook member 50 is positioned in a center portion of each side of flange 22 and has a length less than the length of each side of flange 22. Hook member 50 has a dimension to couple base 12 with body 14 as discussed hereinafter in greater detail.

Figure 7A:
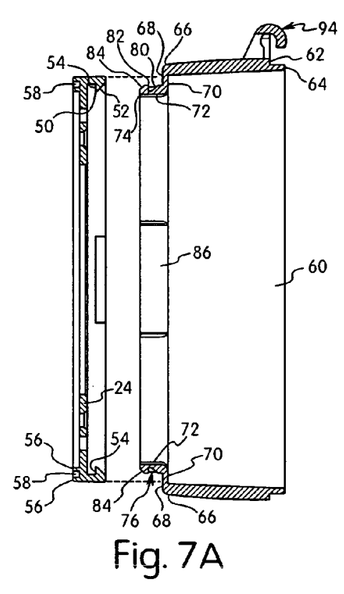
FIGS. 7A and 7B are cross sectional views of the base and body of the cover assembly.
Figure 7B:
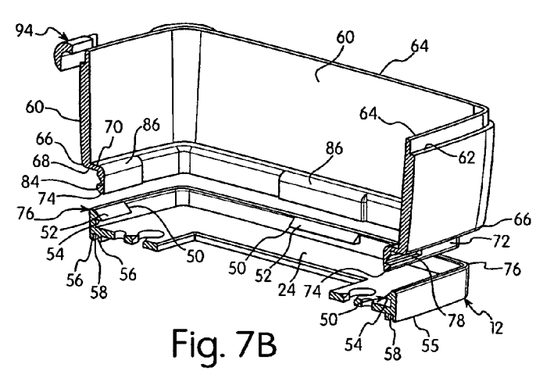
Figure 8:
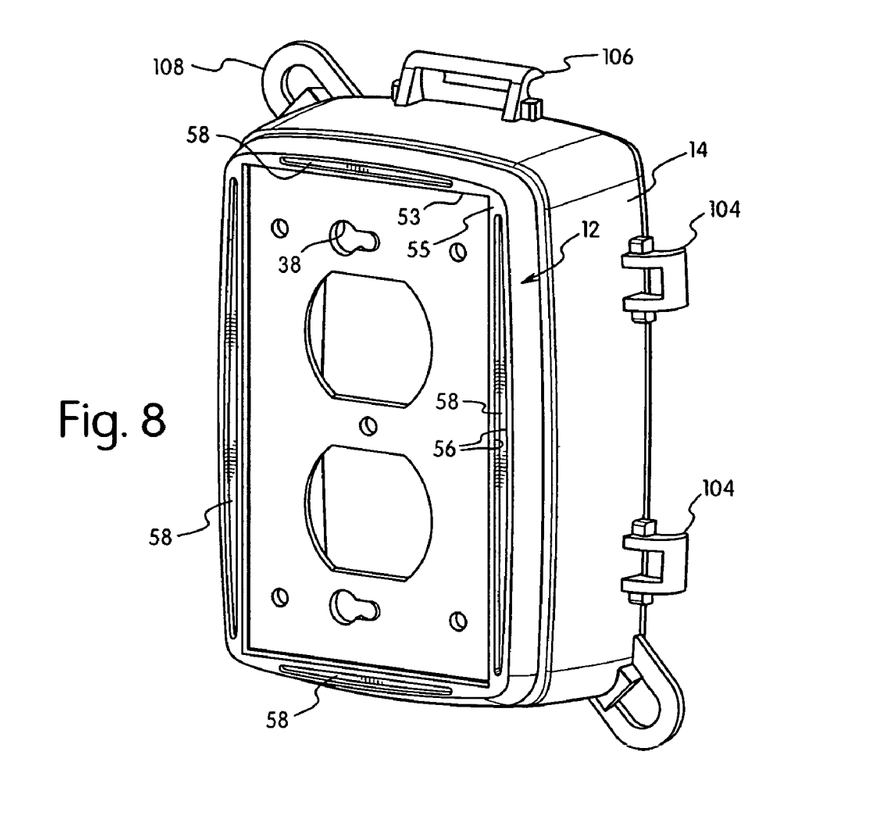
FIG. 8 is a bottom perspective view of the base and body.

Referring to FIGS. 7A, 7B and 8, bottom wall 24 of base 12 has a ridge 53 extending parallel to the side wall of base 12 and having a substantially flat bottom surface 55 with elongated recesses 58 that extend in a longitudinal direction with respect to each side of base 12. The recesses 58 extend along the side edges of base and form a pair of spaced-apart ribs 56. The inner rib is substantially straight while the outer rib is slightly curved. The recesses 58 terminate a short distance from each corner of base 12. The bottom surface 55 of ridge 53 contacts gasket 46 to compress gasket 46 against electrical box 18 to assist in forming a weatherproof seal.

Body 14 includes a plurality of side walls 60 that complement the side edges of base 12 and flange 22. Side walls 60 have a height to accommodate electrical plugs and wires to be enclosed by cover assembly 10. Body 14 has an open top end and an open bottom end that form a through passage. Referring to FIGS. 7A and 7B, side walls 60 have a top edge 62 and a lip 64 extending in a direction parallel to the plane of side walls 60. In a preferred embodiment, lip 64 extends around the perimeter of body 14 and is positioned adjacent the inner surface of side walls 60.

Side walls 60 have a bottom edge 66 opposite top edge 62. Bottom edge 66 defines a shoulder 68 that extends in a generally inward direction with respect to a center of body 14. Shoulder 68 in one embodiment extends inwardly a distance to form a bottom wall portion 70 of body 14 extending inwardly from side wall 60. A lip 72 extends in a generally downward direction from an inner edge of shoulder 68 in a plane substantially parallel to side walls 60. In a preferred embodiment, lip 72 is continuous and extends around the peripheral edge of body 14. Lip 72 has a length corresponding substantially to the length of flange 22 so that lip 72 is received in open top end 34 of base 12. Lip 72 has an outer end 74 that contacts bottom wall 24 when base 12 is coupled to body 14 to assist in forming a weatherproof seal between body 14 and base 12. In one preferred embodiment, outer end 74 of the flange forms a continuous edge to form a seal between body 14 and base 12. Preferably the seal extends around base 12 and body 14 to inhibit moisture penetration into the body. Flange 22 of base 12 has a top end 76 that opposes shoulder 68 when base 12 is coupled to body 14. In the embodiment shown in FIG. 5, top end 76 is spaced from shoulder 68. In alternative embodiments, top end 76 can contact shoulder 68 to assist in forming a weatherproof seal between base 12 and body 14.

Lip 72 of body 14 has an outwardly facing recess 78 in each side portion to form a coupling member for coupling with a corresponding hook member 50 to couple body 14 to base 12 by a snap connection. Each recess 78 has a length and width to accommodate the corresponding hook member 50 and typically has a length less than the length of the side portion of lip 72. Recess 78 has a shape complementing hook member 50 to secure base 12 to body 14. In the embodiment illustrated, recess 78 has a substantially triangular concave shape with an inclined upper face converging to a bottom face 82 which extends in a plane substantially perpendicular to the plane of lip 72. Preferably, recess 78 is spaced from outer end 74 of lip 72 so that outer end 74 contacts bottom wall 24 of base 12 when base 12 is coupled to body 14. Outer end 74 of lip 72 in the embodiment illustrated is formed with an inclined edge 84 to form a camming surface to allow lip 72 to slide past each hook member 50 to an assembled position. As shown in FIG. 7B, the inner surface of lip 72 is provided with a projecting portion 86 extending inwardly to accommodate the depth of recess 78 without reducing the strength of lip 70 and without hindering the coupling of hook member 50 with recess 78.

Base 12 is assembled onto body 14 by hook members 50 and recesses 78. The lip 72 of body 14 extends in a generally axial direction and is dimensioned to fit within the open top end of flange 22 of base 12. In this manner, flange 22 of base 12 fits over lip 72 of body 14. The inclined edge 84 initially contacts the inclined top surface 52 of each coupling member 50 during insertion of lip 72 into the open end of flange 22. A force applied against base 12 causes the side portions of flange 22 to flex outwardly a distance to enable lip 72 to slide past hook members 50. Hook members 50 then snap into the respective recess 78. The opposing inclined surfaces 80 of recesses 78 and 52 of hook member 50 contact each other while the flat surfaces 82 of recesses 80 and 54 of hook member 50 engage each other to prevent separation of base 12 from body 14.

Base 12 and body 14 are preferably made of a plastic material that enables the components to snap together. The base 12 and body 14 can be separated using a suitable tool to pry flange 22 away from lip 72 a distance to release the coupling member 50 from the respective recess 58. In this manner, a base 12 can be removed and substituted for a base having a different opening to accommodate a different electrical device.

Figure 3:
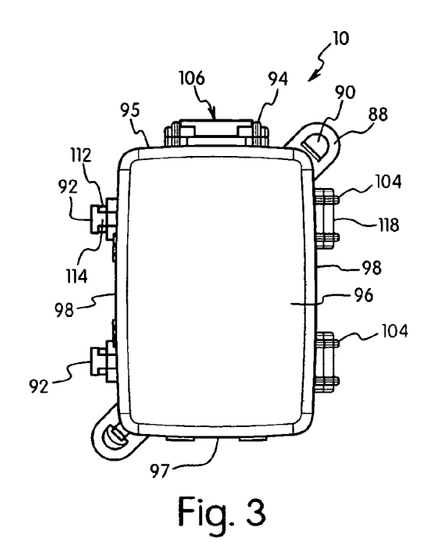
FIG. 3 is a top plan view of the cover assembly of FIG. 1.
Figure 4:
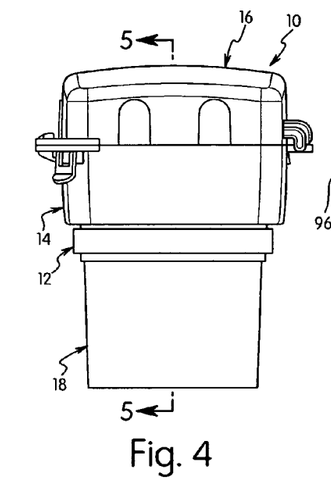
FIG. 4 is an elevational end view of the cover assembly.

Referring to FIGS. 3 and 4, the diagonal corners of body 14 include a tab 88 having an aperture 90 for a locking cover 16 in a closed position by passing the shank of a lock through aperture 90. A first side wall of body 14 is provided with first hinge members 92 positioned adjacent the top edge of side wall 60. In the embodiment illustrated, first hinge members 92 are positioned on the longer side wall of body 14 and spaced apart a distance to hinge cover 16 to body 14 and allow cover 16 to pivot between open and closed positions. In alternative embodiments, a single hinge member can be provided on side wall 60. An adjacent side wall is provided with a second hinge member 94.

Cover 16 has a front wall 96, a top wall 95, a bottom wall 97 and side walls 98 with a dimension corresponding to the dimensions of body 14. One of the side walls 98 is formed with substantially U-shaped knock outs 100 and frangible lines 102 to form openings to allow electrical wiring to exit cover 16 when in the closed position. In one embodiment removable tabs can be inserted into U-shaped recesses to close the recesses when not in use.

Figure 2:
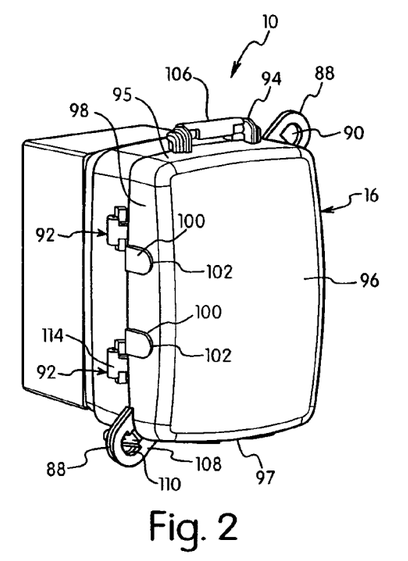
FIG. 2 is a perspective view of the cover assembly.

As shown in FIG. 3, the side wall 98 of cover 16 opposite knock-outs 100 includes hinge members 104 and 106 that are positioned to selectively mate with hinge members 92 and 94. In the embodiment illustrated, hinge members 104 are provided on the long side wall of cover 16 and are spaced apart a distance to cooperate with hinge members 92. Hinge member 106 is provided on the shorter side wall of cover 16 to mate with the second hinge member 94 on body 14. Hinge members 104 and 106 are provided on adjacent side walls of cover 16. Preferably, hinge members 104 and 106 are positioned on the side walls such that when hinge member 106 is coupled to hinge member 94 as shown in FIG. 3, hinge member 104 is oriented on a side opposite first hinge member 92. Hinge member 106 is coupled to hinge member 94 when cover assembly 10 is oriented in a vertical position shown in FIGS. 2 and 3 so that cover 16 pivots upwardly along an axis at a top end of body 14. When cover assembly 10 is oriented in a horizontal position, cover 16 is removed and rotated 180° so that hinge members 104 couple with hinge members 92 and hinge member 106 is oriented on an opposite side from second hinge member 94. In this manner, the pivot axis of cover 16 with respect to body 14 can be changed without the unused hinge members interfering with each other.

Cover 16 includes a tab 108 extending diagonally from a corner. Locking tab 108 includes an aperture 110 for receiving a lock to lock cover 16 in the closed position. Locking tab 108 aligns with one of the locking tabs 88 regardless of which hinges are being used so that cover 16 can be locked to body 14.

As shown in FIG. 6, hinge members 92, 94, 104 and 106 are separable from each other to allow rotation of cover 16 with respect to body 14. Hinge members 92 and 94 on body 14 include a leg 112 extending outwardly from side wall 60 and terminating in a hook member 114. Hinge members 104 and 106 include a leg 116 extending outwardly from side wall 98 and have a hinge pin 118. Hinge pin 118 has a dimension to snap into the recess of hook 114. As shown in FIG. 6, hook 114 is spaced from side wall 60 of body 14 so that hinge pin 118 can be removed from the corresponding hook 114 to allow cover 16 to be disconnected and rotated to selectively engage the desired hinge members.

In use, cover assembly 10 is assembled by selecting the appropriate base 12 and snapping base 12 to body 14. The flange of base 12 is snapped over the lip of body 14. The appropriate hinge members are snapped together to enable cover 16 to pivot with respect to body 14 along the appropriate axis depending on the vertical or horizontal orientation of body 14. Electrical receptacle 20 is mounted in electrical box 18 as shown in FIG. 5. Gasket 46 is positioned between electrical receptacle 20 and base 12 is attached to electrical receptacle 20 by screws 40. Alternatively, base 12 can be attached to the electrical receptacle 20 before assembly with body 14. This ability to mount base 12 to an electrical receptacle or other electrical device without the body being attached provides simplified installation. Once the base 12 is properly mounted, the body 14 can be snapped onto the base 12.

Figure 9:
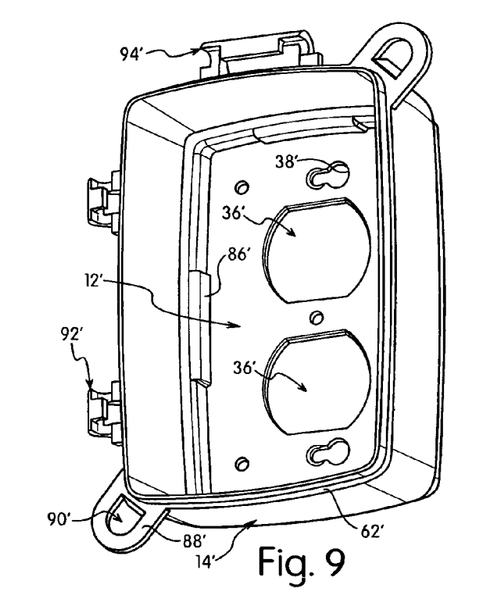
FIG. 9 is a perspective view of the body coupled to the mounting base plate on an alternative embodiment of the invention.
Figure 10:
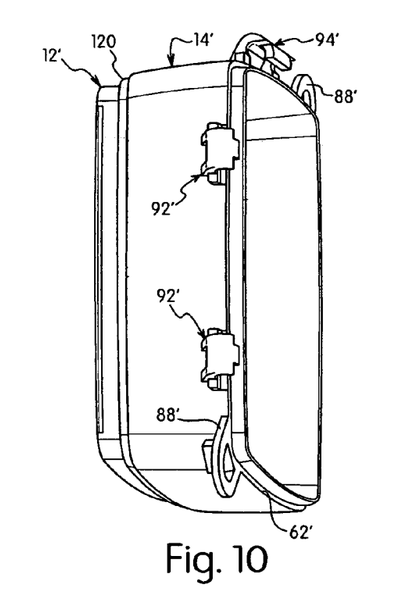
FIG. 10 is a perspective view of the mounting base and body of FIG. 9.
Figure 11:
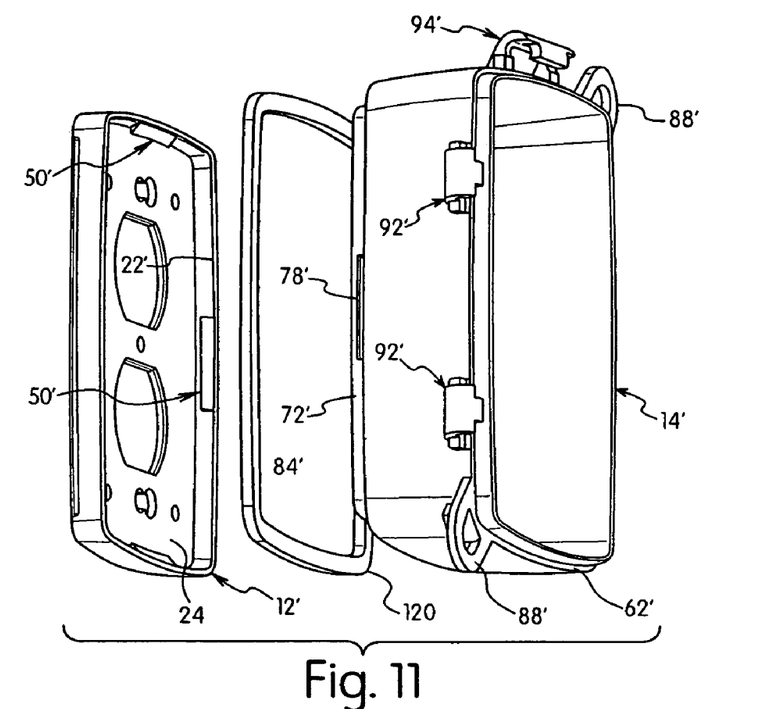
FIG. 11 is an exploded perspective view of the mounting base, seal and body of FIG. 9.

In another embodiment shown in FIGS. 9-11, the cover assembly is substantially the same as in the embodiment of FIGS. 1-8 with the exception of a seal 120. Accordingly, the same components are identified by the same reference number with the addition of a prime. In the embodiment of FIGS. 9-11, seal 120 is positioned between base 12' and body 14'. Preferably, seal 120 is a continuous ring or annular shaped member made of a flexible and resilient polymeric material capable of forming a watertight seal between base 12' and body 14'. Preferably, seal 120 is positioned between a top end of flange 22' and shoulder 68' of body 14. Seal 120 is compressible or flexible to contact shoulder 68' and the top end of flange 22 when assembled to fill the gap between flange 22 and shoulder 68'.

In the embodiment illustrated seal 120 has a substantially square cross section with a flat top and bottom surface. In other embodiments the cross section of the seal can be circular, rectangular or other shapes that are capable of forming a seal between the base and the body. In an alternative embodiment, a foam or liquid sealing material is applied to the body 14 during the manufacturing. The sealing material is allowed to cure on the body 14 to form a flexible seal on the body 14. The body 14 is then snapped to the base 12 with the seal between the base 12 and body 14.

While various embodiments have been chosen to illustrate and describe the invention, it will be understood by those skilled in the art that various changes and modifications can be made without departing from the scope of the invention as defined in the appended claims.

What is claimed is:

1. A cover assembly for mounting to an electrical box for shielding an electrical device mounted in the electrical box, said assembly comprising:
    a mounting base for mounting to the electrical box, said mounting base having a bottom wall with a top face and a bottom face, and having mounting holes in said bottom wall for receiving a fastener for mounting said mounting base to the electrical box, said mounting base having a flange extending in a substantially upward direction from an edge of said top face of said mounting base and defining an open end of said mounting base;
    a body having a side wall with an open top end and an open bottom end, an inner surface and an outer surface, said open bottom end of said body being received within said open end of said mounting base and coupled to said mounting base in a fixed position;
    a hinge member on said side wall of said body at a top end of said body; and
    a cover member coupled to said hinge member and being pivotable between an open position and a closed position.

2. The cover assembly of claim 1, wherein
    said flange of said mounting base has an inner surface with a first coupling member; and
    said outer surface of said side wall has a second member at said bottom end complementing said first coupling member for coupling said body member to said mounting base.

3. The cover assembly of claim 2, wherein
    said first coupling member is a hook, and said second coupling member is a recess having a dimension to receive said hook.

4. The cover assembly of claim 3, wherein
    said flange is continuous and has first and second opposite sides substantially perpendicular to third and fourth sides, and where each of said sides of said flange include a hook coupling member; and
    said side wall of said body has a first wall portion and an opposite second wall portion, and a third wall portion and a fourth wall portion, each of said wall portions including a recess for receiving a corresponding hook.

5. The cover assembly of claim 1, wherein
said bottom end of said body includes a lip extending substantially parallel to a plane of said wall and having an outer dimension to mate within said open end of said mounting base.

6. The cover assembly of claim 5, wherein
said flange of said mounting base has an inner surface with a first coupling member and said lip of said body has an outer surface with a second coupling member.

7. The cover assembly of claim 6, wherein
said flange has a top end; and
said lip is spaced inwardly from said outer surface of said side wall of said body to define a shoulder opposing said top end of said flange.

8. The cover assembly of claim 7, further comprising
a seal member positioned between said shoulder and said top end of said flange for forming a weatherproof seal.

9. The cover assembly of claim 8, wherein
said seal member is a ring made of a resilient material.

10. The cover assembly of claim 7, wherein
said lip is spaced inwardly from said side wall of said body by a bottom wall of said body, said bottom wall having an outwardly facing position defining said shoulder.

11. The cover assembly of claim 1, wherein
said bottom wall of said mounting base has an opening for receiving an electrical device mounted in the electrical box and a mounting hole for receiving a fastener for coupling said bottom face of said mounting base to the electrical device.

12. A cover assembly for mounting to an electrical box for protecting electrical components, the assembly comprising:
a mounting base for mounting to an electrical box, said mounting base having a bottom wall with a top face and a bottom face, and having mounting holes for receiving a fastener for coupling said mounting base to an electrical device and said electrical box, wherein said mounting holes extend between said top face and said bottom face, a flange extending in a substantially upward direction from an edge of said top face, said flange having an inner face with at least one first coupling member facing inwardly toward a center of said base;
a body having a side wall with an open top end, an open bottom end, an inner surface and an outer surface;
a lip extending downwardly from said open bottom end of said side wall, said lip having an inner face and an outer face, said outer face having a second coupling member complementing said first coupling member and facing in an outward direction for coupling said mounting base to said body;
a hinge member on said side wall of said body at said open top end; and
a cover member coupled to said hinge member and being pivotable between an open position and a closed position.

13. The cover assembly of claim 12, wherein
said first coupling member is a hook and said second coupling member is a recess complementing said hook.

14. The cover assembly of claim 12, wherein
said side wall of said body has a first wall portion, an opposite second wall portion, a third wall portion and a fourth wall portion, said third and fourth wall portions being substantially perpendicular to said first and second wall portions, said lip having respective portions extending from said wall portions and each portion of said lip having a second coupling member;
said flange being continuous and having first and second opposite sides and third and fourth opposite sides substantially perpendicular to said first and second sides, each of said sides of said flange having a first coupling member.

15. The cover assembly of claim 14, wherein
said first coupling member is a hook and said second coupling member is a recess complementing said hook.

16. The cover assembly of claim 12, wherein
said lip has an outer end contacting said bottom wall of said mounting base to form a seal between said mounting base and said body.

17. The cover assembly of claim 12, wherein
said flange of said mounting base has a plurality of hooks defining said first coupling member; and
said lip of said body has a plurality of recesses defining said second coupling member.

18. The cover assembly of claim 14, wherein
said body has first and second opposite walls and third and fourth opposite side walls substantially perpendicular to said first and second side walls;
each of said second coupling members having a length less than a length of a respective side wall; and
said flange has first and second opposite sides and third and fourth opposite sides substantially perpendicular to said first and second sides, and each of said first coupling members having a length less than a length of a respective wall.

19. The cover assembly of claim 12, further comprising
a seal positioned between said mounting base and said body.

20. The cover assembly of claim 19, wherein
said seal is a ring made of a flexible material.

21. A cover assembly for mounting to an electrical box supporting an electrical device and shielding the electrical device, said assembly comprising:
a mounting base for mounting to the electrical box, said mounting base having a bottom wall with an access opening receiving said electrical device, and mounting holes for receiving a fastener for coupling said mounting base to said electrical device and said electrical box;
a flange extending in an upward direction from a peripheral edge of said mounting base to define an open top end of said mounting base, said flange having an inner face with at least one coupling member;
a body having a side wall with an open top end, an open bottom end, an inner surface and an outer surface;
a lip extending from an inner edge of said bottom end of said body in a direction substantially parallel to said side wall, said lip being spaced from said outer surface of said side wall to define a shoulder on an axial face of said side wall, said lip having an outer surface with a coupling member to complement said coupling member on said flange, said lip mating with said flange to couple said mounting base to said body, wherein a top face of said flange opposes said shoulder of said side wall of said body, and wherein said flange is received in said open top end of said mounting base;
a seal member disposed between said shoulder and said top end of said flange; and
a cover member hinged to said body and being pivotable between an open and closed position.

22. The cover assembly of claim 21, wherein
said mounting base has first and second opposite side edges and third and fourth opposite side edges substantially perpendicular to said first and second side edges, and said flange is continuously extended around each side edge, and where said flange has a plurality of first coupling members, each first coupling member being positioned at each side edge and having a length less than a length of said side edge; and said side wall of said body has first and second opposing side portions and third and fourth opposing side wall portions substantially perpendicular to said first and second side wall portions, and where said lip has a plurality of second coupling members positioned at each side portion, and have a length less than said side portion.

23. The cover assembly of claim 21, wherein said flange has a plurality of said first coupling members; and said lip has a plurality of said second coupling members.

24. The cover assembly of claim 21, wherein said first coupling member is a hook; and said second coupling member is a recess.

25. The cover assembly of claim 24, wherein said hook faces inwardly with respect to said mounting base; and said recess faces outwardly with respect to said body.

26. The cover assembly of claim 21, wherein said lip is spaced inwardly from said side wall of said body to define said shoulder and to define a bottom wall of said body.

27. The cover assembly of claim 21, wherein said lip has an outer end contacting said bottom wall of said mounting base.

28. A weatherproof cover assembly for mounting to an electrical box for shielding an electrical device mounted in the electrical box, said assembly comprising:

a mounting base for mounting to an electrical box and to an electrical device mounted in the electrical box, said mounting base having a bottom wall with a first face and a second face and having mounting holes extending through said bottom wall for receiving a fastener for coupling said mounting base to said electrical device and said electrical box, said mounting base having a flange extending from said first face in an outward direction substantially perpendicular to a plane of said bottom wall and defining an open end of said mounting base, said flange having an inner surface with an inwardly facing coupling member;

a body having a side wall with an open top end and an open bottom end forming a through passage, said bottom end of said side wall having an outwardly facing coupling member for mating with said inwardly facing coupling member of said flange, said bottom end of said side wall having an outer dimension whereby said flange of said mounting base snaps over said side wall to couple said mounting base to said body;

a first hinge member on a top end of a first side of said side wall and second hinge member on a second side of said side wall perpendicular to said first hinge member; and a cover member selectively coupled to said first hinge member or said second hinge member and being pivotable between an open position and a closed position.

* * * * *